United States Patent
Lai et al.

(10) Patent No.: US 7,740,391 B2
(45) Date of Patent: Jun. 22, 2010

(54) BACKLIGHT MODULE

(75) Inventors: Chih-Chang Lai, Taichung County (TW); Chung-Yang Fang, Tainan County (TW)

(73) Assignee: Wintek Corporation, Taichung County (TW)

( * ) Notice: Subject to any disclaimer, the term of this patent is extended or adjusted under 35 U.S.C. 154(b) by 106 days.

(21) Appl. No.: 11/708,641

(22) Filed: Feb. 21, 2007

(65) Prior Publication Data

US 2008/0198626 A1 Aug. 21, 2008

(51) Int. Cl.
  *F21V 8/00* (2006.01)
(52) U.S. Cl. .................. 362/625; 362/97.2; 362/555; 362/561
(58) Field of Classification Search .............. 362/625, 362/231, 612, 626, 555, 561, 511, 97.1, 97.2, 362/97.3; 349/68
  See application file for complete search history.

(56) References Cited

U.S. PATENT DOCUMENTS

| | | | | |
|---|---|---|---|---|
| 5,718,497 A | * | 2/1998 | Yokoyama et al. | 362/625 |
| 6,669,350 B2 | * | 12/2003 | Yamashita et al. | 362/612 |
| 7,125,137 B2 | * | 10/2006 | Kitajima et al. | 362/153 |
| 2005/0190562 A1 | * | 9/2005 | Keuper et al. | 362/325 |
| 2006/0072339 A1 | | 4/2006 | Li et al. | |
| 2007/0279727 A1 | * | 12/2007 | Gandhi et al. | 359/242 |

* cited by examiner

*Primary Examiner*—Sharon E Payne
(74) *Attorney, Agent, or Firm*—Muncy, Geissler, Olds & Lowe, PLLC

(57) ABSTRACT

A backlight module has a light guide plate and a plurality of light sources. The light guide plate includes a light exit surface, a plurality of light entrance surfaces round the light exit surface, and a plurality of light guide portions disposed on the bottom surface opposite to the light exit surface. The light guide portions corresponding to the same imaginary circle center constitute a concentric arc-shaped light guide portion set. The imaginary circle center of each light guide portion set is located at the outer side of the light entrance surfaces. Light rays projected to one of the light entrance surfaces from the imaginary circle center of each light guide portion set are guided to a light exit surface by the light guide portion set. The wavelength of the light ray projected by each light source is not equal to that of the light projected by another light source.

16 Claims, 9 Drawing Sheets

BACKLIGHT MODULE

BACKGROUND OF THE INVENTION

1. Field of Invention

The present invention relates to a backlight module, and more particularly, to a backlight module using a light emitting diode for enhancing color saturation of a liquid crystal display (LCD).

2. Related Art

With the tremendous progress of science and technology and high development of network, multimedia technique, image data transmission, the demanding for multimedia displays is greatly increasing. In recent years, LCDs having the advantages of thin thickness, light weight, portability, and low radiation compared with conventional Cathode Ray Tube (CRT) displays have been widely used in consumable electronic industries, such as monitors, notebooks, and digital cameras, and have gradually become the mainstream display products in the market.

Backlight module is one of key parts of an LCD Module. Since liquid crystals do not project lights by themselves, the backlight module has a light guide function for providing evenly-distributed light sources and sufficient brightness, so as to display images normally. However, the requirement on the brightness of LCDs and the color saturation of images grows increasingly.

Light sources used in the backlight module mainly include cold cathode fluorescent lamps (CCFL), hot cathode fluorescent lamps, light emitting diodes (LED), electro-luminescence (EL) elements, and the like. Due to the advantages of small size, low operating current, low power consumption, and long service life, the LEDs will become the main light source applied in the backlight module.

Some techniques of using LEDs as the light sources for the backlight module have been disclosed in prior arts. However, there are still many problems to be solved. In the prior art, three LEDs including red light, blue light, and green light LEDs are used to project red, blue, and green lights which are the three primary colors of light, and the three colors of lights can be mixed into a white light. However, the LEDs of three colors are packaged into an encapsulated housing, and then the ON/OFF and intensity of the three LEDs are controlled respectively, thus causing troubles in control. The three color light sources must used together with the design of light guide portion on the light guide plate, for example, several light guide portions fabricated on the bottom surface of the light guide plate via a screen printing technique. The light guide portions are rough surface design of the bottom surface of the light guide plate. Based on the diffusion principle, the incident light is diffused by the light guide portion, and then passes through the light guide plate surface. However, as different light colors indicate different wavelengths, the light guide plate generates different reflection ratio and diffusion capability to the light rays with different wavelengths. Therefore, if the light guide structure of the light guide plate is designed directed to the brightness uniformity of the red light, it certainly influences the brightness uniformity of the blue light and the green light. Therefore, if the red, blue, and green LEDs are lit up, the lights of three colors cannot be uniformly mixed into the white light.

In order to uniformly blend the light sources of the backlight module into a white light, a backlight module is disclosed in U.S. Patent No. 2006/0072339, entitled "Backlight Module", which has a blue light LED as a light source and a light guide plate, and a fluorescent substance is placed between the light source and the light guide plate. The fluorescent substance when irradiated by the blue light is activated and projects a yellow light. It is much easier for the lights of two colors i.e. the blue light and the yellow light to be uniformly mixed into a white light as compared with the lights of three colors, thereby forming a plane light source of the backlight module. At this time, since the yellow light is not one of the three primary colors of light, but the mixture of the red light and the green light. Therefore, the color purities of the red light frequency spectrum and the green light frequency spectrum contained in the yellow light frequency spectrum are not high, so it cannot meet the requirements on the color saturation of LCDs.

In order to solve the above problems, a color filter with high purity can be used for the above color lights to pass through, and the color light passing through the high-purity color filter has a relative high color purity of the light frequency spectrum. Relatively, the high-purity color filter filters out a major part of the light rays beyond required frequency spectrums, thus greatly reducing the transmittance of the light rays which causes the problem of insufficient brightness of the LCDs.

Therefore, in the above technologies, in order to produce LCDs with high color saturation and brightness, high-purity color filters and high-brightness LED must be used or the number of LEDs must be increased, which relatively enhances the manufacturing cost of the backlight module. However, in order to solve the problem of the color purity of light sources, a high-purity color light can be used together with the design of light guide portion on the light guide plate, such that the color light can be uniformly mixed into the white light, thereby enhancing the color saturation of LCDs without reducing the brightness of LCDs, which can be used to solve the problems in the prior art.

SUMMARY OF THE INVENTION

In view of the above problems, the present invention is directed to solving the problems existing in the prior art that the color saturation of the LCD is poor due to the insufficient color purity of the light source of the backlight module, different colors of lights with different wavelengths cannot be mixed into a uniform white light, and the front-side illuminance of the backlight module is insufficient.

In order to achieve the above objects, the present invention discloses a backlight module, which has a light guide plate and a plurality of light sources. The light guide plate comprises a light exit surface, a plurality of light entrance surfaces around the light exit surface, and a plurality of light guide portions disposed on the bottom surface opposite to the light exit surface. The plural sets of light guide portions corresponding to the same imaginary circle center constitute a concentric arc-shaped light guide portion set. The imaginary circle center of each light guide portion set is located at the outer side of the light entrance surface, and the light sources are corresponding to each light guide portion set respectively. Lights are projected to one of the plurality of light entrance surfaces from the imaginary circle center of each light guide portion set, such that the light ray projected by each light source is guided in a normal line direction of the light exit surface by the corresponding light guide portion set. The wavelength of the light projected by each light source is different from that of the light ray projected by another light source.

The efficacy of the present invention involves using three color lights with different wavelengths as the backlight sources and also using the light guide portion with its optical paths exactly designed, so as to enhance the color saturation of the light source. Thus, different color lights can be uniformly mixed into the white light. The "V-shaped" light guide portion can give a preferred directionality of the light rays coming out from the light exit surface, and thereby enhancing the front-side illuminance of the backlight module, which can be used to solve the problems existing in the prior art. The present invention can also reduce the additional manufacturing cost resulting from using the high purity color filter and high brightness LED or using an increased number of LEDs, and thus the products and prices can meet the market requirements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

In order to make the objects, constructions, features, and functions of the present invention apparent, the present invention is further illustrated with the embodiments below.

Figure 1A:
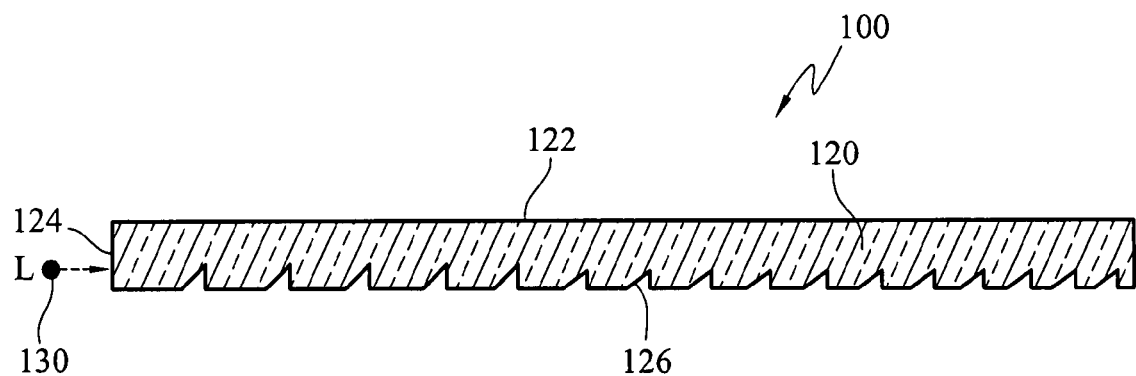
FIG. 1A is a side view of a single light source according to the first embodiment of the backlight module of the present invention.
Figure 1B:
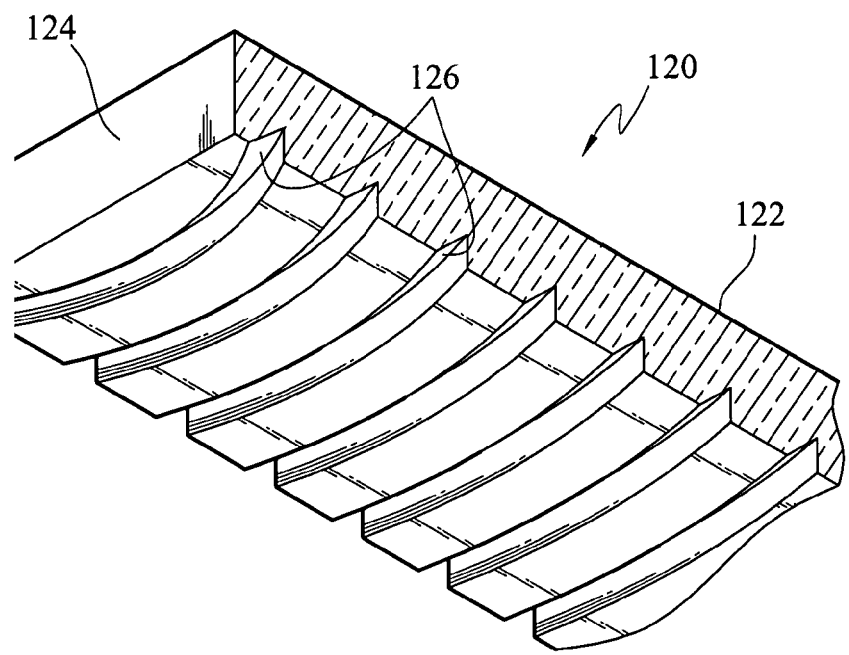
FIG. 1B is an isometric view of a light guide plate structure according to the first embodiment of the backlight module of the present invention.

Referring to FIGS. 1A and 1B, a side view of a single light source according to the first embodiment of the backlight module of the present invention and an isometric view of the light guide plate structure according to the first embodiment of the backlight module of the present invention are shown. As shown in FIGS. 1A and 1B, the backlight module 100 includes a light guide plate 120 and a light source 130. The light guide plate 120 has a light exit surface 122 and a light entrance surface 124. A plurality of continuously extended light guide portions 126 in an "inverted-V" shape are formed on a bottom surface opposite to the light exit surface 122. The "inverted-V" light guide portions 126 are grooves on the bottom surface of the light guide plate 120 facing the light exit surface 122, and all the "inverted-V" light guide portions 126 corresponding to the same imaginary circle center constitutes a concentric arc-shaped light guide portion set, and those corresponding to different imaginary circle centers constitute different light guide portion sets. The light source 130 is disposed at the position of the corresponding imaginary circle center of each light guide portion set, and the light L emitted by the light source 130 enters the light guide plate 120 via the light entrance surface 124.

Figure 1C:
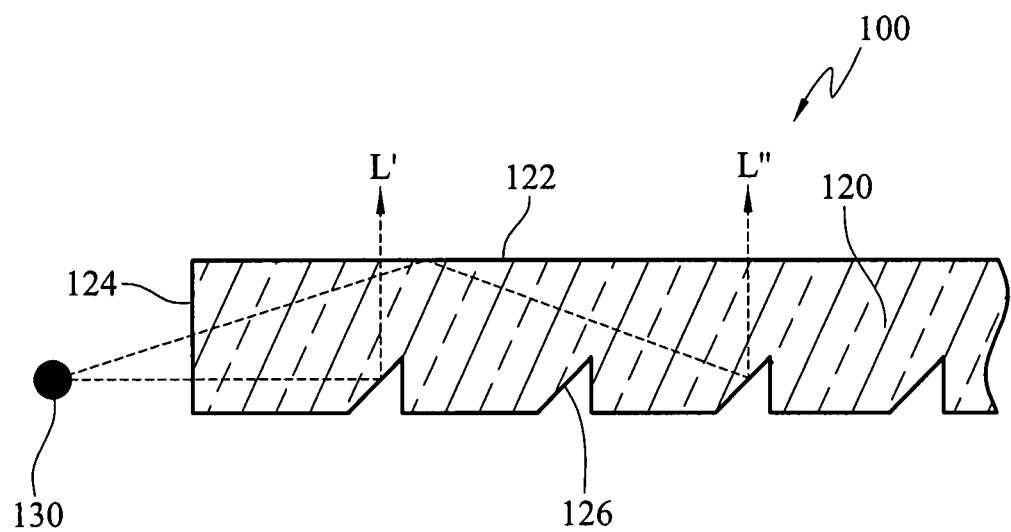
FIG. 1C is a schematic view of the guiding of lights according to the first embodiment of the backlight module of the present invention.

Referring to FIG. 1C, a schematic view of the guiding of the lights according to the first embodiment of the backlight module of the present invention. As shown in FIG. 1C, the backlight module 100 has a light guide plate 120 and a light source 130. The light guide plate 120 includes a light entrance surface 124, a light exit surface 122, and a plurality of "inverted-V" light guide portions 126 depressed inward the light guide plate. The light entrance surface 124 is a side surface of the light guide plate 120 adjacent to the light source 130 for the lights L' and L" to be irradiated therein. The light exit surface 122 is a top surface adjacent to the light entrance surface 124 for projecting the lights L' and L". The "inverted-V" light guide portions 126 are located on a bottom surface corresponding to the light exit surface 122, and are continuously extended groove structure, so as to guide the incident lights L' and L" in the normal line direction of the light exit surface 122. Each of the "inverted-V" light guide portions 126 is corresponding to an imaginary circle center, and a plurality of "inverted-V" light guide portions 126 corresponding to the same imaginary circle center constitute one concentric arc-shaped light guide portion set. In addition, the light source 130 is disposed at the position of the corresponding imaginary circle center of each light guide portion set, and can be a light source with different wavelengths.

When the lights L' and L" projected by the light source 130 at the position of the imaginary circle center of the light guide portion set pass through the light entrance surface 124, a total internal reflection transmission occurs in the light guide plate 120. With the structure of the "inverted-V" light guide portions 126 arranged in the circular arc shape and a specific design of slope angle, the lights L' and L" are totally reflected internally once or several times and then come out in the normal line direction of the light exit surface 122 via the slope of the "inverted-V" light guide portions 126 by means of total internal reflection. For example, the light L' passing through the light exit surface 122 comes out along the normal line direction of the light exit surface 122 by means of undergoing the total internal reflection once, the light L" passing through the light exit surface 122 comes out along the normal line direction of the light exit surface 122 by means of undergoing the total internal reflection twice, and so forth. Since the lights coming out from the light exit surface 122 are mainly concentrated near the normal line direction of the light exit surface 122, a maximum illumination can be obtained on the light exit surface 122 of the light guide plate 120. In addition, according to the light sources 130 with different wavelengths, the designs of slope angle of the "inverted-V" light guide portions 126 are also different. If the light L projected by the light source 130 enters the "inverted-V" light guide portions 126 not corresponding to the light source 130, the light L when being totally reflected internally by the "inverted-V" light guide portions 126 will not come out from the light exit surface 122 along the normal line direction of the light exit surface 122. Therefore, with the above design of backlight module 100, the light sources 130 with different wavelengths can be used together with different arc-shaped "inverted-V" light guide portion 126 structures, such that each "inverted-V" light guide portion 126 structure can only guide the lights projected by the corresponding light sources 130 with various different wavelengths to come out in the normal line direction of the light exit surface 122, thereby enhancing the uniformity of mixed lights of the light sources provided by the backlight module 100.

Figure 2A:
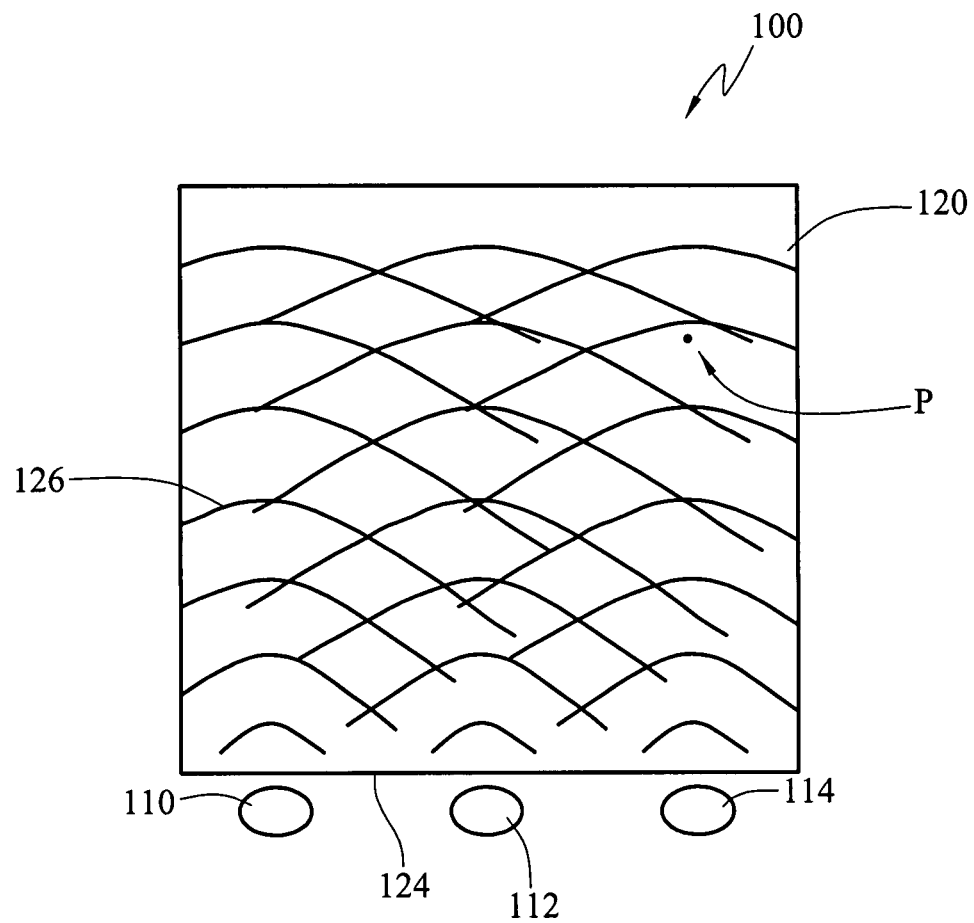
FIG. 2A is a bottom view of three light sources arranged in a straight line according to the first embodiment of the backlight module of the present invention.

Referring to FIG. 2A, a bottom view of three light sources according to the first embodiment of the backlight module of the present invention. As shown in FIG. 2A, three LED light sources of different colors and wavelengths i.e. a red light source 110, a green light source 112, and a blue light source 114 are arranged in a straight line, wherein the wavelength of the red light is 630-780 nm, the wavelength of the green light is 500-570 nm, and the wavelength of the blue light is 420-470 nm, and the three light sources are respectively corresponding to three arc-shaped light guide portion sets constituted by "inverted-V" light guide portions 126. Each of the "inverted-V" light guide portions 126 is a continuously extended groove structure. As the distances from various positions in the light guide plate 120 to each of the color light sources 110, 112, and 114 are different, the light guide effect of a certain color light may be emphasized, leading to the poor light guide effect of other color lights in the prior art, such that the intensity of the color lights coming out from a certain position on the light exit surface 122 are not uniform, and the color lights cannot be mixed into a uniform white light. In order to solve the above problem, the present invention employs the arc-shaped "inverted-V" light guide portion 126 structures with the color light sources 110, 112, and 114 as the imaginary circle centers, such that each "inverted-V" light guide portion 126 structure can only guide the corresponding one of the lights with different wavelengths to come out along the normal line direction of the light exit surface 122, so as to enhance the intensity of the lights projected from the light exit surface 122 by each of the color light sources 110, 112, and 114. Therefore, according to the distance from each position in the light guide plate 120 to each light source, each concentric arc-shaped "inverted-V" light guide portion 126 corresponding to each of the color light sources 110, 112, and 114 has a different density distribution. That is to say, the density distribution of each light guide portion set is different from that of another light guide portion set, and the density increases in the direction away from the color light sources 110, 112, and 114, so as to adjust the emission intensity of the color light sources 110, 112, and 114 at various positions on the light exit surface 122.

With the above design of appropriate adjustment, the color lights coming out from any position on the light exit surface 122 have the same intensity, such that the three kinds of lights with different wavelengths can come out from any position of the light exit surface 122 and can be uniformly mixed into the white light, so as to solve the problem of poor light mixing effect caused by high-purity color lights in the prior art. For example, a P region on the light exit surface 122 as shown in FIG. 2A is most adjacent to the blue light source 114 and far away from the red light source 110. Thus, the intensity of the red light coming out from the P region on the light exit surface 122 is usually less than that of the blue light, thus causing the blue shift of the mixed light. In this embodiment, through adjusting the "inverted-V" light guide portion 126 to have different density distribution according to different distances, the red, green, and blue lights on the P region in the light guide plate 120 have the same intensity, such that the three kinds of lights with different wavelengths can uniformly come out from the P region on the light exit surface 122 and mixed into the white light. In this embodiment, the color light sources with different wavelengths are not limited to three light sources, and the incident light L is not limited to entering the light guide plate 120 from the same light entrance surface 124, and also the position of the light source is also not limited in this embodiment.

Figure 2B:
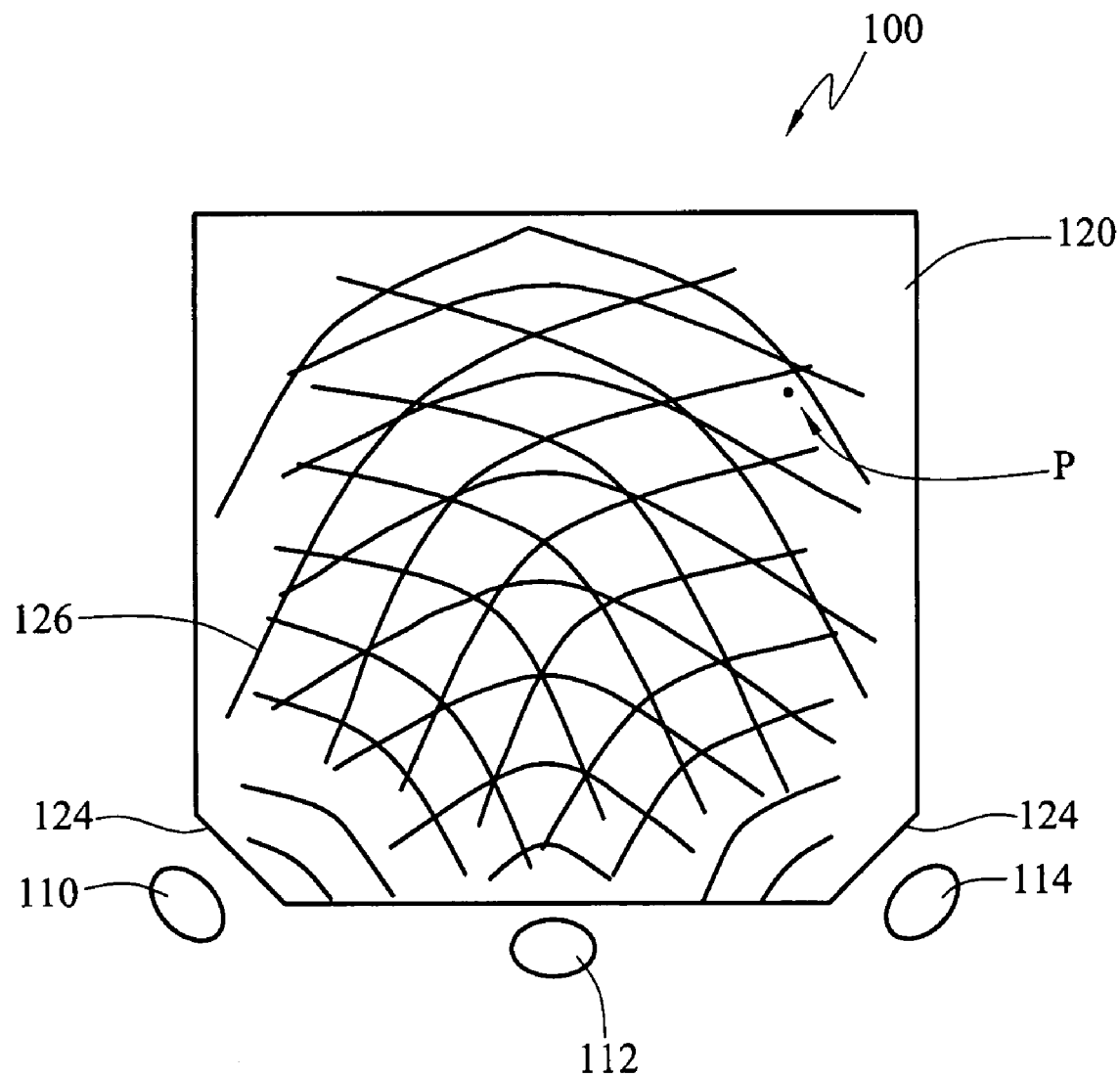
FIG. 2B is a bottom view of the position of three different light sources according to the first embodiment of the backlight module of the present invention.
Figure 2C:
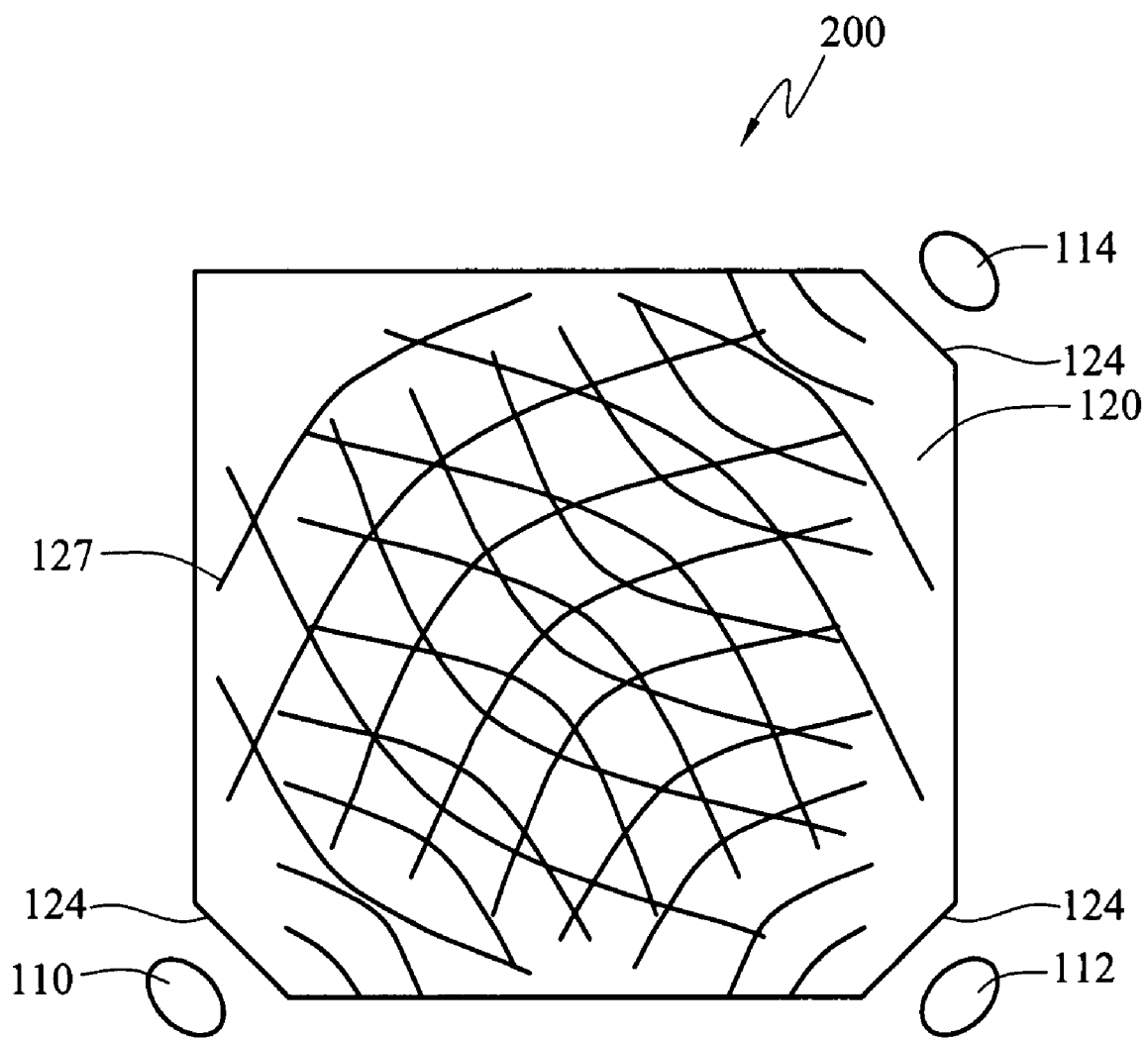
FIG. 2C is a bottom view of the arrangement of three different light sources according to the first embodiment of the backlight module of the present invention.
Figure 2D:
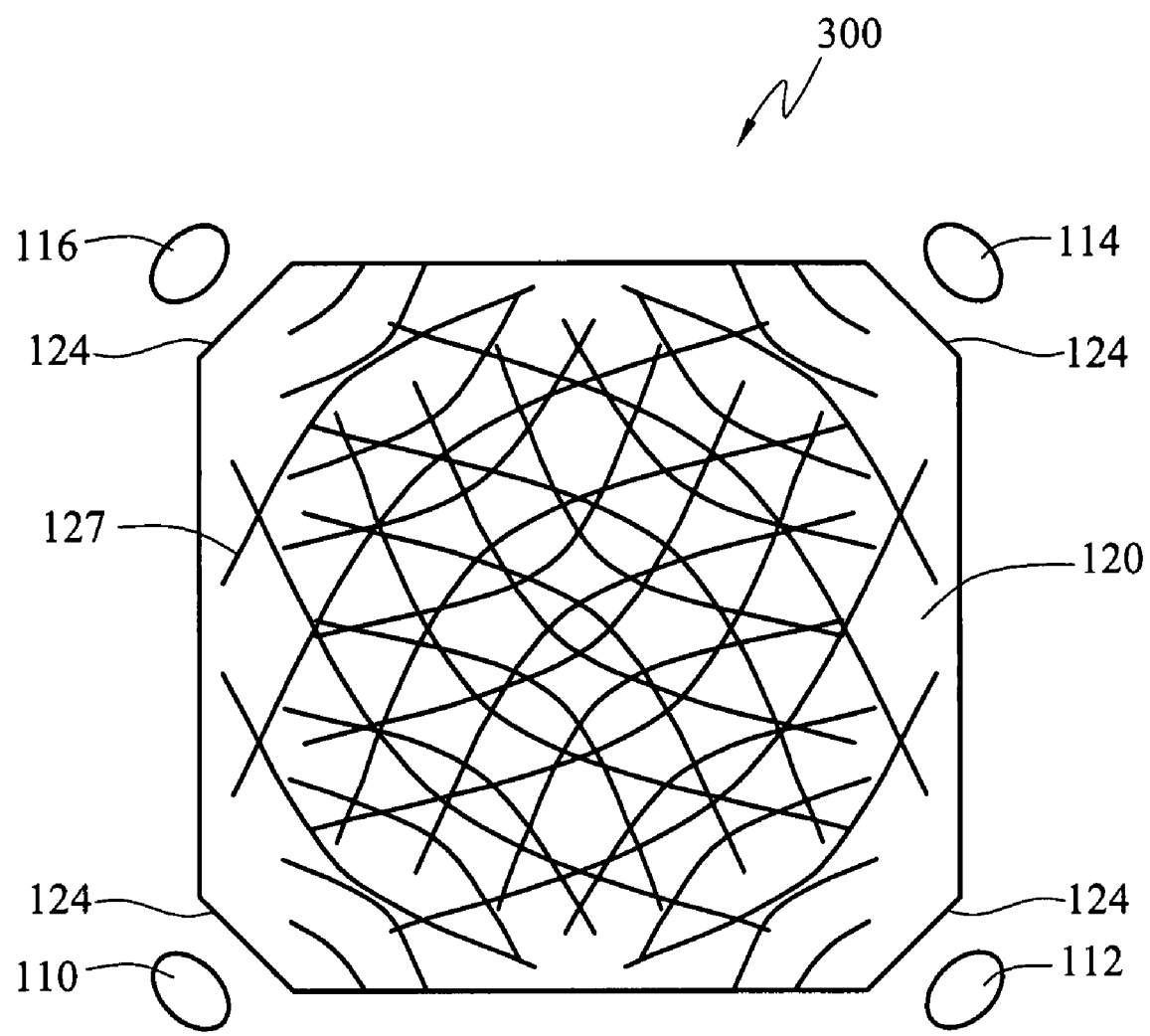
FIG. 2D is a bottom view of the arrangement of a plurality of light sources according to the first embodiment of the backlight module of the present invention.
Figure 3A:
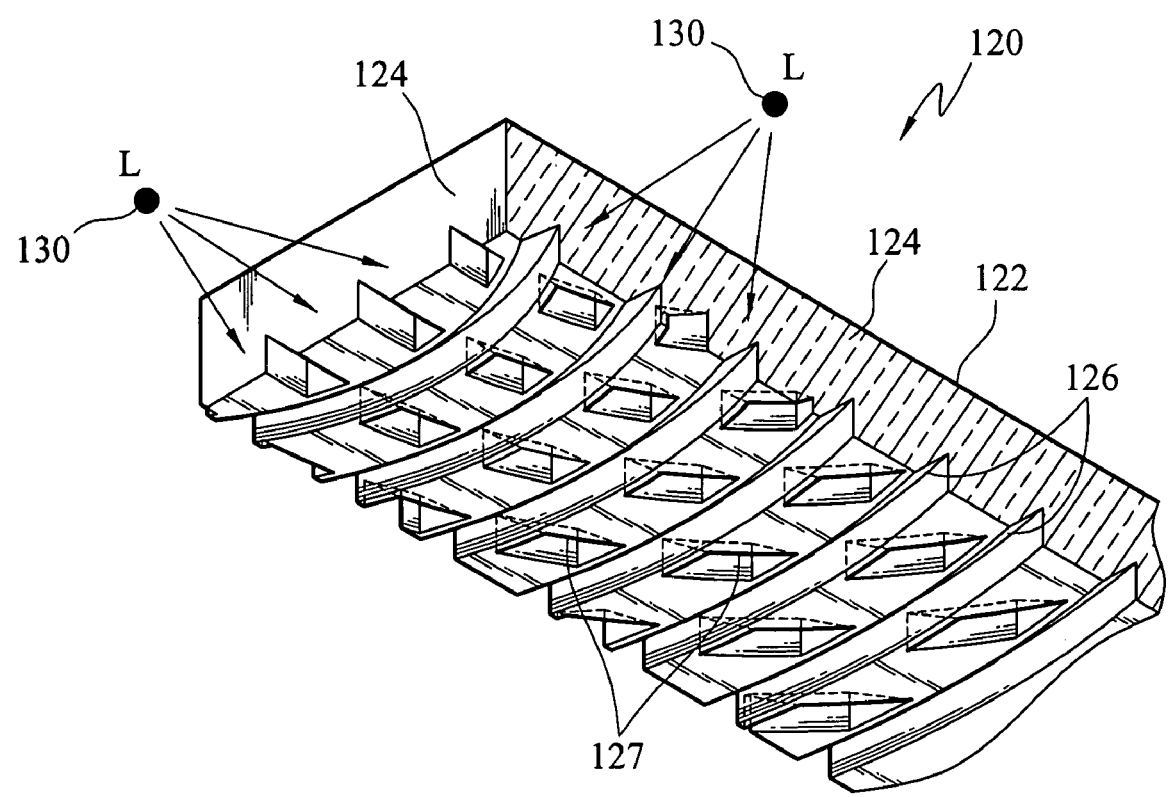
FIG. 3A is an isometric view of a light guide plate structure according to the second embodiment of the backlight module of the present invention.
Figure 3B:
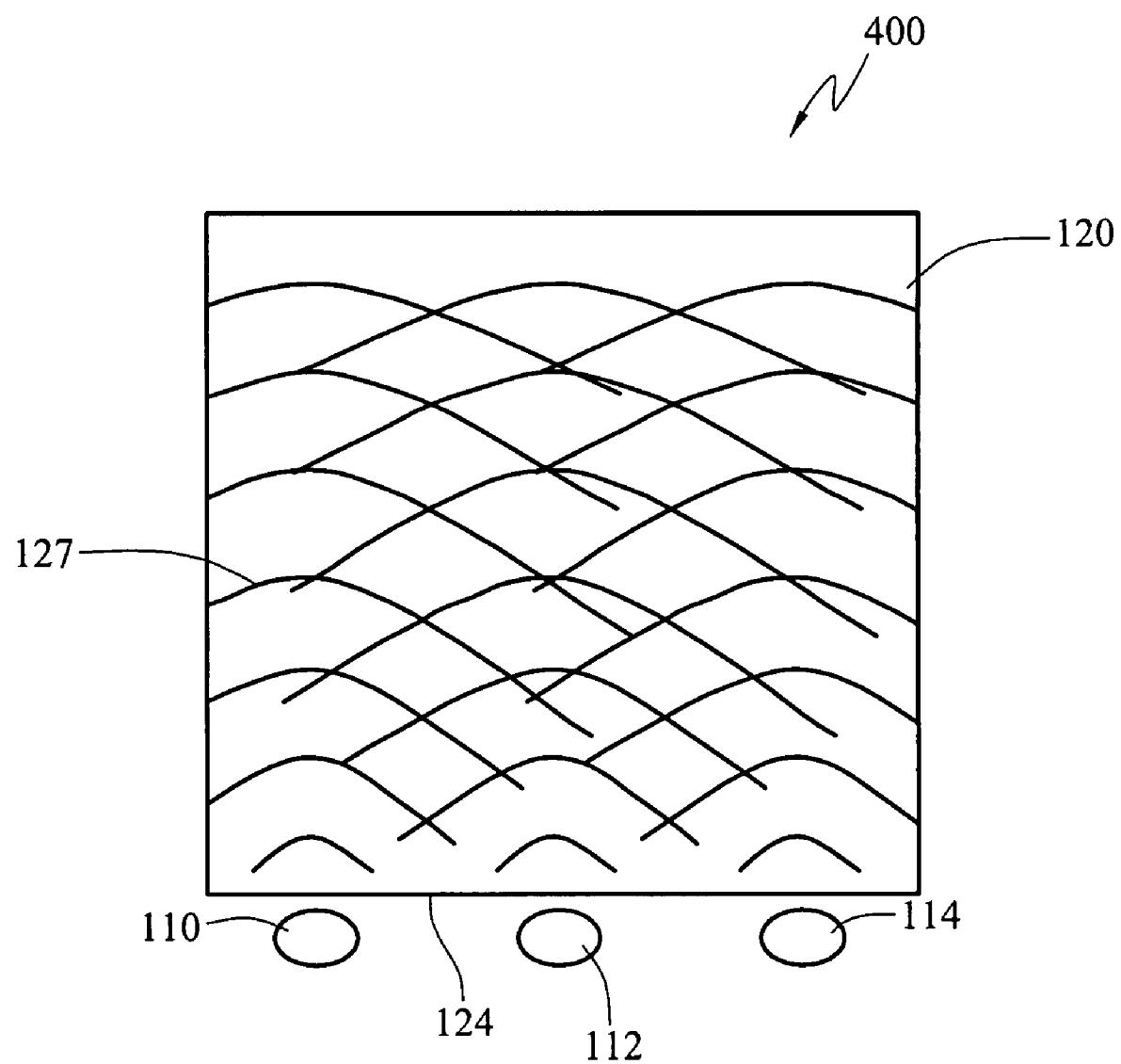
FIG. 3B is a bottom view of three light sources according to the second embodiment of the backlight module of the present invention.

Referring to FIGS. 2B, 2C, and 2D, the bottom views of different light source positions and a plurality of light sources according to the first embodiment of the backlight module of the present invention are shown. As shown in FIGS. 2B and 2C, most of the structures of the backlight modules 200, 300 are the same as that of the backlight module 100 in FIG. 2A, and the main difference lies in that each of the color light sources 110, 112, and 114 can be placed at different positions around the light guide plate 120, such that the color light sources 110, 112, and 114 with different wavelengths project lights to the light guide plate 120 via the light entrance surfaces 124 at different angles. As shown in FIG. 2B, the light sources are not located in the same straight line, and the red light source 110 and the blue light source 114 are located at two adjacent corners of the light guide plate 120, the green light source 112 is located between the red light source 110 and the blue light source 114, and each of the color light sources 110, 112, and 114 has the corresponding light entrance surface 124. As shown in FIG. 2C, the color light sources 110, 112, and 114 are located at three corners of the light guide plate 120, and have the corresponding light entrance surfaces 124. Therefore, the backlight module of the present invention can adopt the above design in accordance with the appearance design of the module and the limitation of the volume, so as to enhance the freedom in the design of the backlight module. Furthermore, as shown in FIG. 2D, most of the structures of the backlight module 400 are the same as that of FIG. 2C, and the main difference lies in that the number of light sources around the light guide plate 120 is increased to be four kinds of color lights, namely a red light source 110, a green light source 112, a blue light source 114, and a cyan light source 116 with different wavelengths. The wavelength of the red light is 630-780 nm, the wavelength of the green light is 500-570 nm, the wavelength of the blue light is 420-470 nm, and the wavelength of the cyan is 500-470 nm, and each light source is located at a different corner around the light guide plate 120. The light L enters the light guide plate 120 from different light entrance surfaces 124, and then is reflected by the "inverted-V" light guide portion 126 to form the uniformly mixed white light. Therefore, with the four color lights with high purities and different wavelengths, the color saturation of the light source provided by the backlight module is enhanced.

The backlight module of the present invention can be operated with a driving method of for example, field sequential, that is, each display image frame structure is divided into a plurality of sub-structures, for example, a red light sub-structure, a green light sub-structure, and a blue light sub-structure respectively. During each period of individual sub-structures, only the lights of a single color are projected and then reflected and guided by the "inverted-V" light guide portion 126, and then come out from the light exit surface 122 to reach the display panel. With the switching of time period, the light source of a different color and the corresponding image frame sub-structures are converted. With the backlight module of the present invention and the fast switching effect, the three color lights are mixed into the white light in human eyes due to a visual persistence effect. The advantages of the display method lies in that no color filters are required, and the lighting time of each color light can be reduced by ⅔, thereby reducing the manufacturing cost and saving the power consumption.

Referring to 3A and 3B, an isometric view and a bottom view of the light guide plate structure according to the second embodiment of the backlight module of the present invention are shown. Most of the structures in the backlight module 500 of this embodiment are the same as that of the backlight module 100 in the first embodiment, and the main difference lies in that the light guide plate 120 in the backlight module 500 includes "inverted-V" light guide portions 127 with a non-continuously extended structure and divided into a plurality of sections in addition to the "inverted-V" light guide portions 126 with continuously extended structures. Three concentric arc-shaped light guide portion sets are formed on the bottom surface of the light guide plate 120 corresponding to different light source positions, and the are surfaces of the three sets of concentric arc certainly have a plurality of intersections. In order to further simplifying in the manufacturing processes, some light guide portions are designed to be non-continuously extended structures. Such the forming of the non-continuously extended "inverted-V" light guide portions 127 can simplify the design of the intersections of the light guide portions, thereby reducing the complexity in the manufacturing. Definitely, the number and the relative positions of light sources of the backlight module 500 in the second embodiment are also the same as those as shown in FIGS. 2B, 2C, and 2D, that is, the light sources used are not limited to three kinds, and the incident light is not limited to entering the light guide plate 120 via the same light entrance surface 124, and also the position of the light source is not limited in this embodiment. In addition, the backlight module 400 in this embodiment can also be operated with driving method of field sequential, such that various color lights are reflected and guided by the continuously and non-continuously extended "inverted-V" light guide portions 126 and 127 and come out from the light exit surface 122 to reach the display panel, and then mixed into the white light in human eyes due to the visual persistence effect.

Figure 4A:
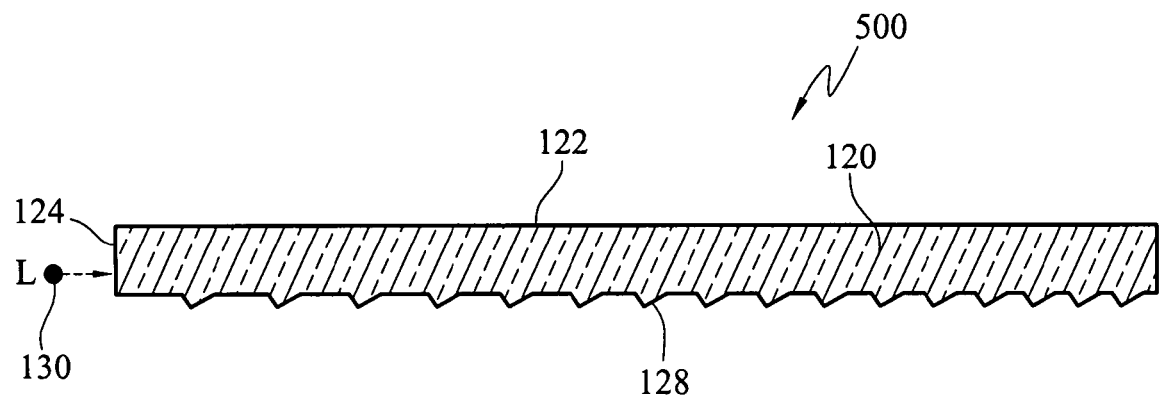
FIG. 4A is a side view of a single light source according to the third embodiment of the backlight module of the present invention.
Figure 4B:
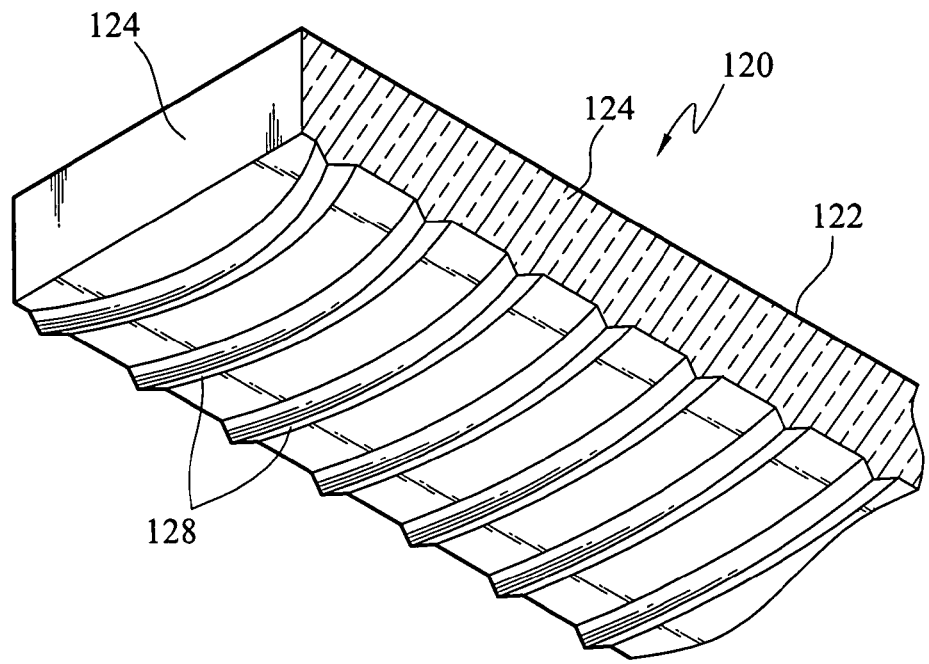
FIG. 4B is an isometric view of the light guide plate structure according to the third embodiment of the backlight module of the present invention.

Referring to FIGS. 4A and 4B, a side view of a single light source and an isometric view of the light guide plate structure according to the third embodiment of the backlight module of the present invention are shown. As shown in FIGS. 4A and 4B, the backlight module 600 includes a light guide plate 120 and a plurality of light sources 130. The backlight module in this embodiment differs from that in the first and second embodiments mainly in that the light guide portions are "V-shaped" light guide portions 128 protruding from the light guide plate 120, and each of the "V-shaped" light guide portions 128 is a continuously extended groove structure. The light guide plate 120 in this embodiment has a light exit surface 122 and a plurality of light entrance surfaces 124 around the light exit surface 122, and plural sets of "V-shaped" light guide portions 128 formed on a bottom surface opposite to the light exit surface 122. The "V-shaped" light guide portion 128 is a structure protruding from the bottom surface of the light guide plate 120, and each "V-shaped" light guide portion 128 is corresponding to one imaginary circle center. A plurality of "V-shaped" light guide portions 128 corresponding to the same imaginary circle center constitute one concentric arc-shaped light guide portion set. A plurality of light sources 130 is disposed at the positions of the corresponding imaginary circle center of each light guide portion set, and the light sources 130 includes a red light source 110, a green light source 112, and a blue light source 114. The light L enters the light guide plate 120 via the light entrance surfaces 124.

Figure 4C:
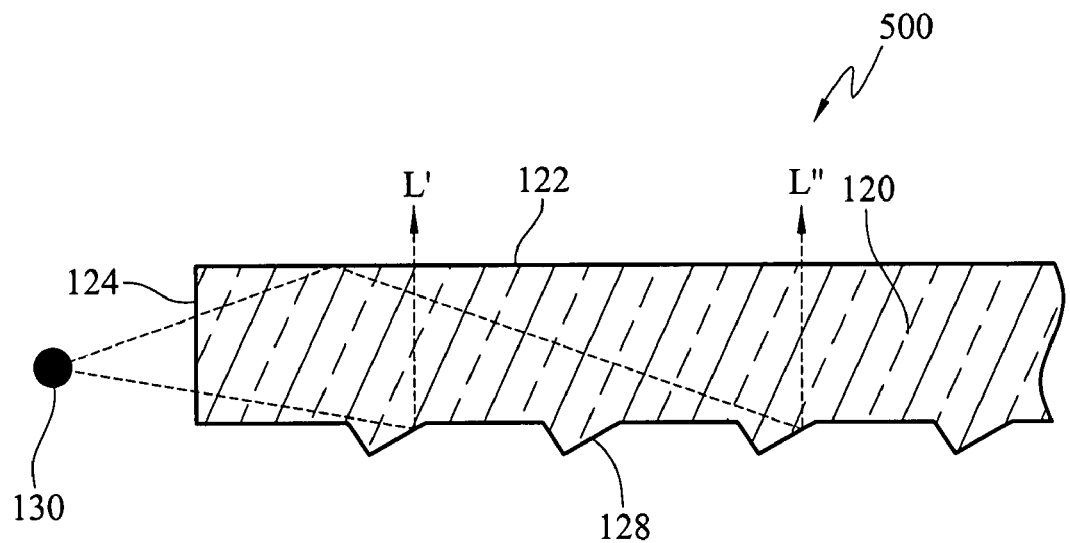
FIG. 4C is a schematic view of the guiding of lights according to the third embodiment of the backlight module of the present invention.

As shown in FIG. 4C, when lights L' and L" projected by a light source 130 at the imaginary circle center of the light guide portion set pass through the light entrance surfaces 124, the total internal reflection transmission occurs in the light guide plate 120. With the structure of the light guide portion 128 arranged in the arc shape and the specific slope angle design, the lights L' and L" are totally reflected internally once or several times and then come out in the normal line direction of the light exit surface 122 via the slope of the "V-shaped" light guide portion 128 by means of total internal reflection. The light L' passing through the light exit surface 122 comes out in the normal line direction of the light exit surface 122 by undergoing the total internal reflection once, the light L" passing through the light exit surface 122 comes out in the normal line direction of the light exit surface 122 by undergoing the total internal reflection twice, and so forth.

Definitely, the numbers and relative positions of the light sources of the backlight module 600 in the third embodiment of the present invention are also as those as shown in FIGS. 2B, 2C, and 2D, that is, the light sources used are not limited to three kinds, and the incident light is not limited to enter the light guide plate 120 from the same light entrance surface 124, and also the position of the light source is not limited in this embodiment. In addition, the backlight module 600 in this embodiment can also be operated with the driving method of field sequential.

Figure 5:
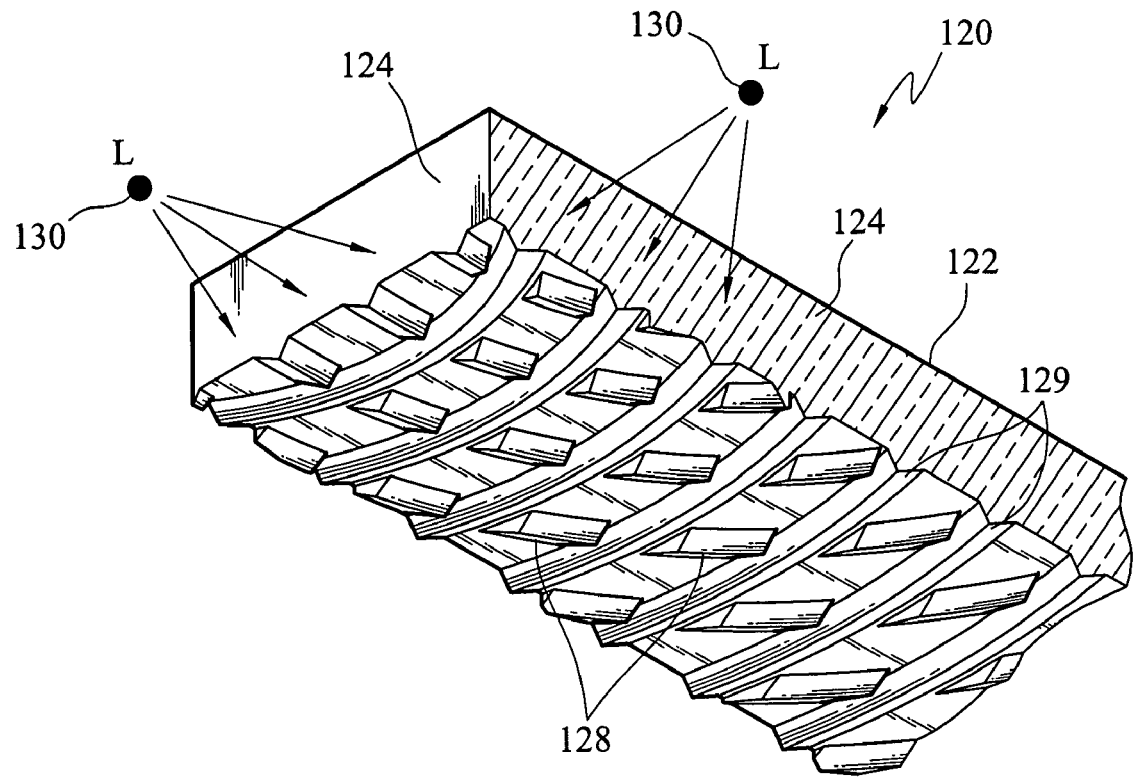
FIG. 5 is an isometric view of the light guide plate structure according to the forth embodiment of the backlight module of the present invention.

Referring to FIG. 5, an isometric view of the light guide plate structure according to a fourth embodiment of the backlight module of the present invention. Most of the structures of the light guide plate in this embodiment are the same as that of the third embodiment, and the main difference lies in that the light guide plate 120 includes "V-shaped" light guide portions 129 with non-continuously extended structures in addition to "V-shaped" light guide portions 128 with continuously extended structures. The forming of the non-continuously extended "V-shaped" light guide portion 129 simplifies the design of the intersections of the light guide portions, thereby reducing the complexity in manufacturing. Definitely, the number and relative positions of the light source of the backlight module in the fourth embodiment are also as those as shown in FIGS. 2B, 2C, and 2D, that is, the light sources used are not limited to three kinds, the incident light is not limited to enter the light guide plate 120 via the same light entrance surface 124, and also the position of the light source is not limited in this embodiment. In addition, the backlight module in this embodiment can also be operated with the driving method of field sequential.

Therefore, the present invention can solve the problems existing in the prior art. In the backlight module disclosed in the present invention, more than three kinds of high-purity color light sources with different wavelengths are used to facilitate enhancing the color saturation of LCDs. Furthermore, the light guide plate of the backlight module has the concentric arc-shaped light guide portion structures, so the high-purity color lights with different wavelengths can be uniformly mixed into the white light, thereby enhancing the uniformity of the light sources of LCDs. In addition, the present invention can be used to reduce the additional manufacturing cost caused by using color filters with high color purity and high-brightness LED or increasing the number of the LEDs, such that the products and prices fabricated according to the present method can meet the market requirements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight module, comprising:
    a light guide plate, having a light exit surface, at least one light entrance surface, and a bottom surface, the bottom surface opposite to the light exit surface, the bottom surface including a plurality of arc-shaped light guide portions that are arranged with imaginary circle centers, all the arc-shaped light guide portions arranged with the same imaginary circle center constituting a concentric arc-shaped light guide portion set, wherein each of the concentric arc-shaped light guide portion sets has a density distribution different from one another, and each of the imaginary circle centers is located at the outer side of the light entrance surface; and
    a plurality of light sources, each of the light sources emitting a light having a wavelength different from one another, and disposed at one of the imaginary circle centers.

2. The backlight module as claimed in claim 1, wherein the light sources are light emitting diodes (LEDs).

3. The backlight module as claimed in claim 1, wherein each of the light guide portions is a continuously extended groove depressed inward the light guide plate.

4. The backlight module as claimed in claim 3, wherein each of the light guide portions is an inverted "V" groove.

5. The backlight module as claimed in claim 1, wherein each of the light guide portions is a non-continuously extended groove depressed inward the light guide plate and divided into a plurality of sections.

6. The backlight module as claimed in claim 5, wherein each of the light guide portions is an inverted "V" groove.

7. The backlight module as claimed in claim 1, wherein each of the light guide portions is a continuously extended groove protruding outward the light guide plate.

8. The backlight module as claimed in claim 7, wherein each of the light guide portions is a "V-shaped" protruding structure.

9. The backlight module as claimed in claim 1, wherein each of the light guide portions is a non-continuously extended structure protruding outward the light guide plate.

10. The backlight module as claimed in claim 9, wherein each of the light guide portions is a "V-shaped" protruding structure.

11. The backlight module as claimed in claim 1, wherein the light sources comprise a red light source, a blue light source, and a green light source, wherein the wavelength of the red light is 630-780 nm, the wavelength of the blue light is 420-470 nm, and the wavelength of the green light is 500-570 nm.

12. The backlight module as claimed in claim 1, wherein the light sources comprise a red light source, a blue light source, a green light source, and a cyan light source, wherein the wavelength of the red light is 630-780 nm, the wavelength of the blue light is 420-470 nm, the wavelength of the green light is 500-570 nm, and the wavelength of the cyan is 500-470 nm.

13. The backlight module as claimed in claim 1, wherein the light guide plate has one light entrance surface, and the light sources are located at the outer side of the light entrance surface.

14. The backlight module as claimed in claim 1, wherein the light guide plate has a plurality of light entrance surfaces, and the light sources are distributed at the outer side of the light entrance surfaces.

15. The backlight module as claimed in claim 1, wherein the density distribution of each light guide portion set increases along the direction away from the corresponding light source.

16. The backlight module as claimed in claim 1, wherein each of the light guide portions is capable of guiding light rays of the corresponding light source to come out in normal line direction of the light exit surface.

* * * * *